(12) United States Patent
Xing et al.

(10) Patent No.: US 8,738,022 B2
(45) Date of Patent: May 27, 2014

(54) SYSTEM AND METHODS FOR BEAM SHAPING IN A SELF-ORGANIZING NETWORK

(71) Applicant: FutureWei Technologies, Inc., Plano, TX (US)

(72) Inventors: Shuqing Xing, San Diego, CA (US); Yuqiang Tang, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/646,557

(22) Filed: Oct. 5, 2012

(65) Prior Publication Data

US 2013/0090126 A1    Apr. 11, 2013

Related U.S. Application Data

(60) Provisional application No. 61/544,155, filed on Oct. 6, 2011.

(51) Int. Cl.
*H04W 72/04*    (2009.01)

(52) U.S. Cl.
USPC ........................................ 455/452.1; 455/446

(58) Field of Classification Search
CPC ..... H04W 16/10; H04W 24/00; H04W 72/04; H04B 7/0617; H04B 7/2041
USPC ............ 455/67.11, 434, 446, 452.1; 342/354, 342/373
See application file for complete search history.

(56) References Cited

U.S. PATENT DOCUMENTS

| | | | |
|---|---|---|---|
| 2003/0060205 A1 | 3/2003 | Shapira | |
| 2008/0181170 A1 | 7/2008 | Branlund et al. | |
| 2009/0310501 A1* | 12/2009 | Catovic et al. | 370/252 |
| 2010/0279616 A1* | 11/2010 | Jin et al. | 455/62 |

OTHER PUBLICATIONS

"Notification of Transmittal of the International Search Report and the Written Opinion of the International Searching Authority, or the Declaration," International Application No. PCT/US12/59231, Applicant: Huawei Technologies Co., Ltd., mailing date: Jan. 4, 2013, 7 pages.

* cited by examiner

*Primary Examiner* — Sam Bhattacharya
(74) *Attorney, Agent, or Firm* — Slater & Matsil, L.L.P.

(57) ABSTRACT

Methods are components are included herein for implementing beam shaping algorithms to optimize antenna beam patterns. An embodiment method includes dividing a geographical area into a plurality of geographical bins, setting up a plurality of zones for a cell based on a plurality of boundary thresholds, receiving a plurality of signal measurements from a plurality of user equipments across the geographical bins, classifying the geographical bins into the different zones by comparing the signal measurements to the boundary thresholds of the zones, calculating a plurality of gain adjustments for the corresponding geographical bins in at least some of the zones, and generating a beam shaping pattern based on the gain adjustments.

23 Claims, 8 Drawing Sheets

US 8,738,022 B2

SYSTEM AND METHODS FOR BEAM SHAPING IN A SELF-ORGANIZING NETWORK

This application claims the benefit of U.S. Provisional Application Ser. No. 61/544,155, filed on Oct. 6, 2011, and entitled "System and Method for Beam Shaping in a Self-Organizing Network," which is incorporated herein by reference as if reproduced in its entirety.

TECHNICAL FIELD

The present invention relates to the field of wireless communications, and, in particular embodiments, to a system and methods for beam shaping in a self-organizing network (SON).

BACKGROUND

In wireless or cellular networks, manual radio frequency (RF) planning may not be adequate for changing RF environment because user equipments (UEs), such as mobile phones or smartphones, are typically moving. Further, system loading is changing dynamically, when more users enter the network or the quality of service (QoS) of each user is adjusted. Initial RF parameters are set sub-optimally due to inaccurate/insufficient input to the RF planning tool and inherent inaccuracies with RF propagation models. A smart antenna is used in some wireless or cellular networks referred to as self-organizing networks (SONs) to increase capacity and optimize network coverage. In a SON, a smart antenna (also referred to as an adaptive antenna system (AAS)) can use collected data and beam shaping and splitting algorithms to provide optimized antenna patterns, and thus improve communications. Beam shaping is the functionality that optimizes the shape of antenna beam patterns to better cover the intended service area to improve coverage and decrease interference. Thus improving beam shaping algorithms helps to further improve coverage and better resolve interference issues.

SUMMARY

In one embodiment, a method for beam shaping in a wireless network includes dividing a geographical area into a plurality of geographical bins, setting up a plurality of zones for a cell based on a plurality of boundary thresholds, receiving a plurality of signal measurements from a plurality of UEs across the geographical bins, classifying the geographical bins into the different zones by comparing the signal measurements to the boundary thresholds of the zones, calculating a plurality of gain adjustments for the corresponding geographical bins in at least some of the zones, and generating a beam shaping pattern based on the gain adjustments.

In another embodiment, a network component providing beam shaping in a wireless network includes a processor and a computer readable storage medium storing programming for execution by the processor, the programming including instructions to receive a plurality of signal measurements from a plurality of UEs across a plurality of geographical bins for a region that covers a cell, classify the geographical bins into a plurality of zones for the cell based on comparison between the signal measurements and a plurality of pre-determined boundary thresholds for the zones, calculate a plurality of gain adjustments for the corresponding geographical bins in at least some of the zones, and generate a beam shaping pattern based on the gain adjustments.

In yet another embodiment, an apparatus that supports beam shaping in a wireless network includes a first module coupled to a second module and configured to generate a beam shaping pattern by calculating a plurality of signal gains for a plurality of geographical bins configured across a cell, wherein the signal gains are calculated based on a plurality of signal measurements and a plurality of pre-determined boundary thresholds for a plurality of zones configured for the cell, and wherein the second module is configured to calculate a converged antenna pattern based on the beam shaping pattern.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A system and methods are included herein for implementing beam shaping algorithms to optimize antenna beam patterns and thus improve coverage and decrease interference. The beam shaping is implemented to improve coverage, e.g., using a vertical beam shaping scheme, based on measurement reports (MRs) from user equipments (UEs), user location information, and key performance information (KPI). The beam shaping can also be implemented e.g., using a horizontal beam shaping scheme, to enhance network capacity based on user and/or traffic distribution information. This is achieved by weighing the antenna beam pattern towards area with higher concentration of users and/or higher density of traffic.

The system includes dividing a geographical coverage region into a plurality of geographical bins. The bins are covered by one or more cells, where bins in each cell are mapped into different zones of the cell, e.g., four centric zones of the cell with different boundaries based on pre-determined thresholds. A smart antenna (or an AAS) assigned to the cell can then adjust the antenna pattern for the cell by determining and applying a beam shaping pattern based on calculated gain adjustment requirements for the bins. The gain adjustment requirements are determined by comparing the zone thresholds to measured pilot/reference signals from the UEs across the bins. A plurality of beam shaping algorithms and related functions are applied to determine the beam shaping pattern to improve coverage, decrease interference, prevent signal overshooting, increase system capacity, or combinations thereof.

Figure 1:
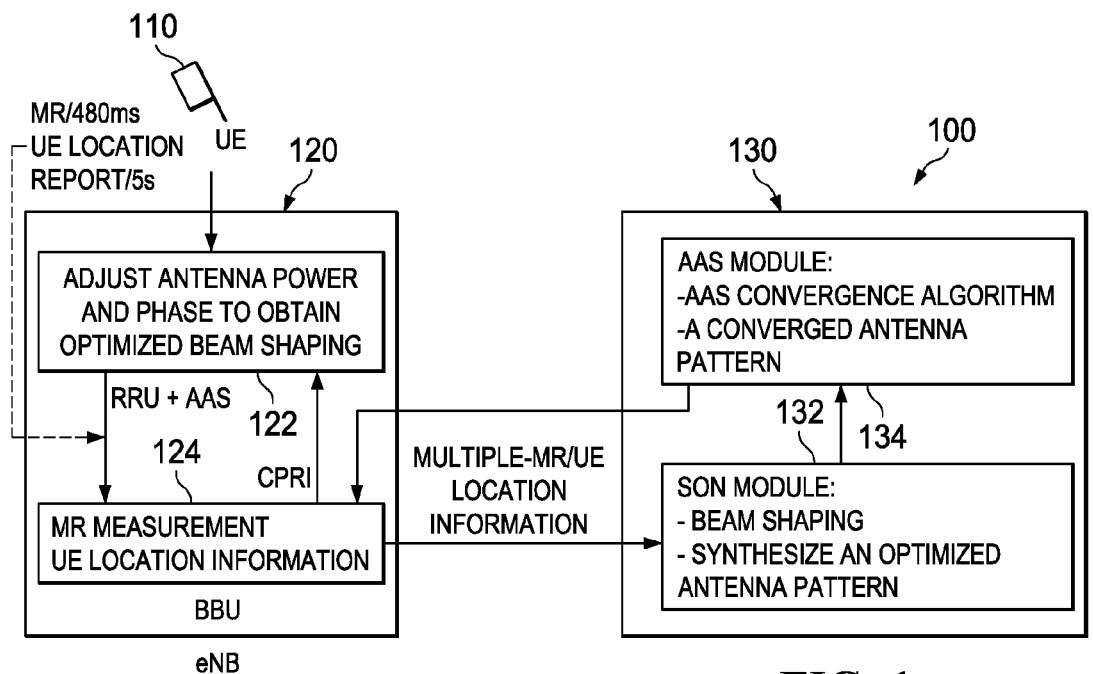
FIG. 1 is a block diagram of an embodiment SON/AAS.

FIG. 1 illustrates an embodiment SON/AAS 100 configured to adjust antenna patterns for coverage areas by applying adaptive beam shaping. The SON/AAS 100 comprises an E-UTRAN Node B (eNB) 120, also known as an Evolved Node B, a SON/AAS unit 130, and one or more UEs 110 that are configured to communicate with the eNB 120. The UEs 120 are located in one or more cells (not shown) of a wireless or cellular network. Examples of UEs 120 include cellular phones, smartphones, laptops, and computer tablets. In other embodiments, the systems 100 may comprise a base station or any other radio transceiver configured similar to the eNB 120.

The eNB 120 comprises a first radio unit 122 (labeled as a remote radio unit (RRU) in FIG. 1) and a second radio unit 124 (labeled as a base band unit (BBU)) coupled to the first radio unit 122. The SON/AAS unit 130 comprises a SON module 132 and an AAS module 134 coupled to the SON module 132. The first radio unit 122 is configured to communicate with the UE(s) 110, including receiving measured pilot/reference signals or measurement reports from the UE(s) 110 and UE location information or reports. The first radio unit 122 sends this information to the second radio unit 124. The second radio unit 124 is configured to process the information and/or reports from the first radio unit 122, for instance to aggregate information or reports from different UEs 120 for each cell, and forward the processed information/reports to the SON module 132.

The SON module 132 is configured to calculate or determine one or more optimized antenna patterns for the cells using beam shaping algorithms and related functions, as described below, and send the results to the AAS module 134. The AAS module 134 is configured to calculate a converged antenna pattern using convergence algorithms to achieve the calculated optimized antenna pattern in accordance with the results of the SON module 132. The AAS module 134 may calculate parameters (e.g., antenna phase and power) for the converged antenna pattern. The AAS module 134 sends back the information of the converged antenna pattern to the second radio unit 124, which then forwards the information to the first radio unit 122, e.g., via a Common Public Radio Interface (CPRI). The first radio unit 122 then uses the information to adjust the antenna power and phase to obtain the optimized beam shaping or pattern for one or more cells.

The SON/AAS 100 can implement adaptive beam shaping as described above (e.g., at the SON module 132) to improve network or cell coverage based on UE location information and measurement reports. A vertical beam shaping pattern can be used to improve network coverage. Additionally, adaptive beam shaping can be implemented to enhance network capacity (i.e., to serve more UEs 120 and/or support more communication traffic) based on UE and traffic information. A horizontal beam shaping pattern can be implemented to enhance network capacity, which is based on weighting the antenna beam pattern towards areas with higher concentration of users (UEs 120) and/or higher density of traffic.

Figure 2:
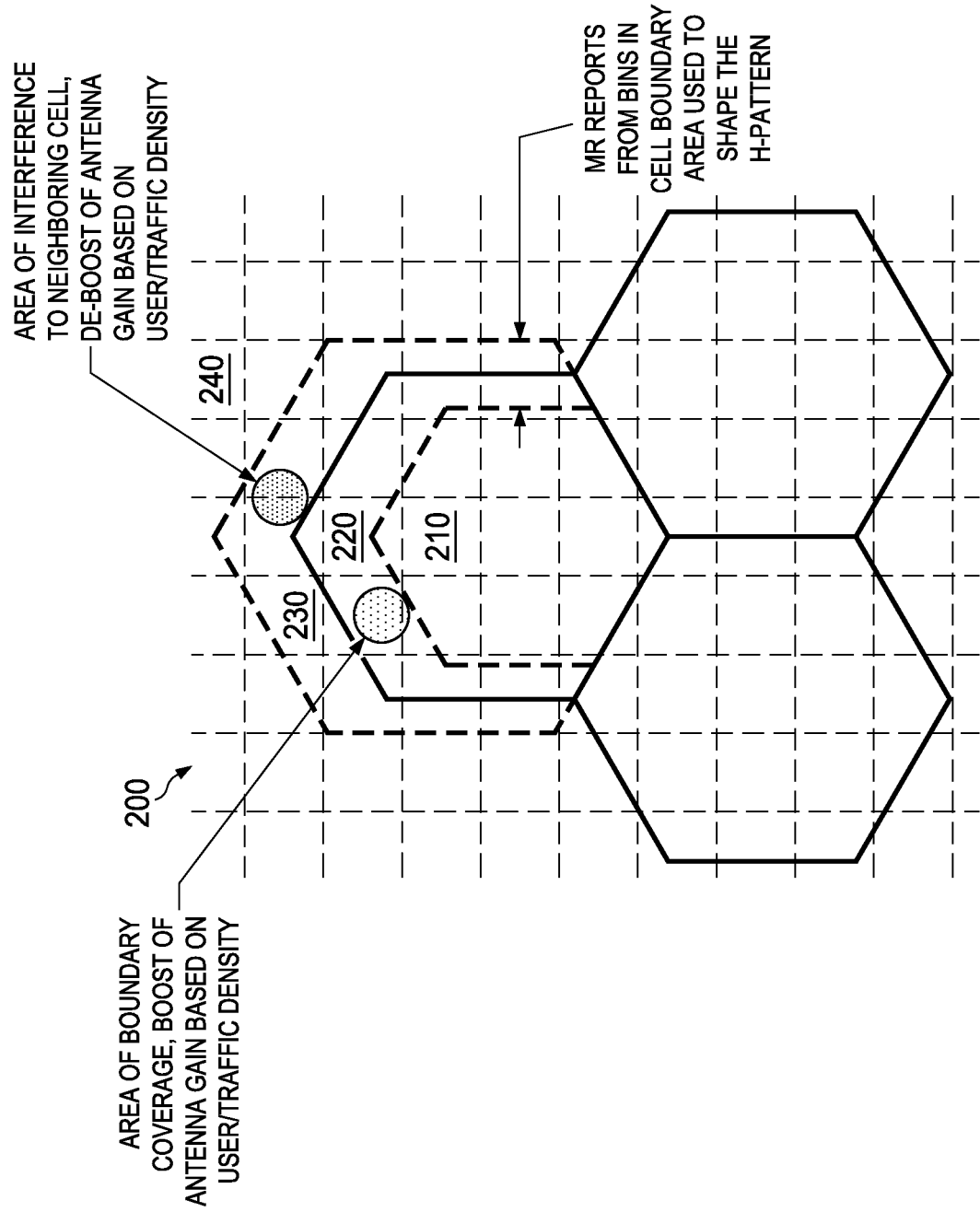
FIG. 2 illustrates an embodiment zone classification for a cell.

FIG. 2 is a horizontal geographical representation of an embodiment zone classification 200 for a cell. The zone classification 200 is used to implement adaptive beam shaping in the SON/AAS 100. The zone classification 200 comprises dividing a wireless or cellular network coverage region, including one or more cells, into a plurality of bins. The bins may be adjacent square-shaped geographical areas (shown as adjacent square blocks in FIG. 2), for example of 1 square meter ($m^2$), 25 $m^2$, or other sizes. Each cell is assigned a plurality of zones concentric to the cell and that have different boundaries based on pre-determined thresholds. For example, the boundaries correspond to pre-determined thresholds of signal levels in decibel (dB).

The zones may include a center zone 210 inside the cell boundary, an intermediate or boundary zone 220 that corresponds to a normal cell boundary, an interference zone 230 that extends outside the cell boundary, and an outer zone 240 beyond the interference zone 230. The zones are used as criteria to classify the bins into the different zones and determine gain adjustments for the bins within the different zones of the cell. A plurality of measured pilot/reference signals (e.g., received by the eNB 120 from one or more UEs 120) at different bins are compared to the thresholds of the corresponding zones to determine the gain adjustment requirements for each bin. The obtained gain adjustment requirements for the bins are then used to calculate or determine the beam shaping pattern to cover the bins in the cell and neighbor cells. The beam shaping pattern is applied by the eNB (or cell tower/base station) serving the cell. The beam shaping pattern can be applied on top a default antenna pattern to cover the bins, resulting in an optimized antenna pattern.

The beam shaping pattern is determined using a beam shaping algorithm, which may include adding (or boosting) gain in bins within the boundary zone 220 and outside the center zone 210 and reducing (or de-boosting) gain in bins within the interference zone 230 and outside the boundary zone 220 based on different decision criteria. The decision criteria include the fixed thresholds of the zones, pre-determined deviation in the difference between the signal measurements and the thresholds, estimated path loss of the antenna signal away from the center of the cell, user density in the zones, traffic density, or combinations thereof.

Measurements can be ignored from UEs in the outer zone 240 (outside the interference zone 230) since such UEs are targeted by other neighbor cells and not the cell under consideration (i.e., corresponding to the boundary zone 220). Further, no gain adjustments are needed or implemented for bins in the center zone 210, since signal strength closer to the center of the cell is expected to be sufficiently high for such bins. In another embodiment, the zones include the intermediate or boundary zone 220, the interference zone 230, and the outer zone 240 without the center zone 210. In this case no threshold is assigned or considered for the center zone 210 and all bins within the boundary zone 220, including bins closer to the center of the cell, are subject to gain adjustment.

Figure 3:
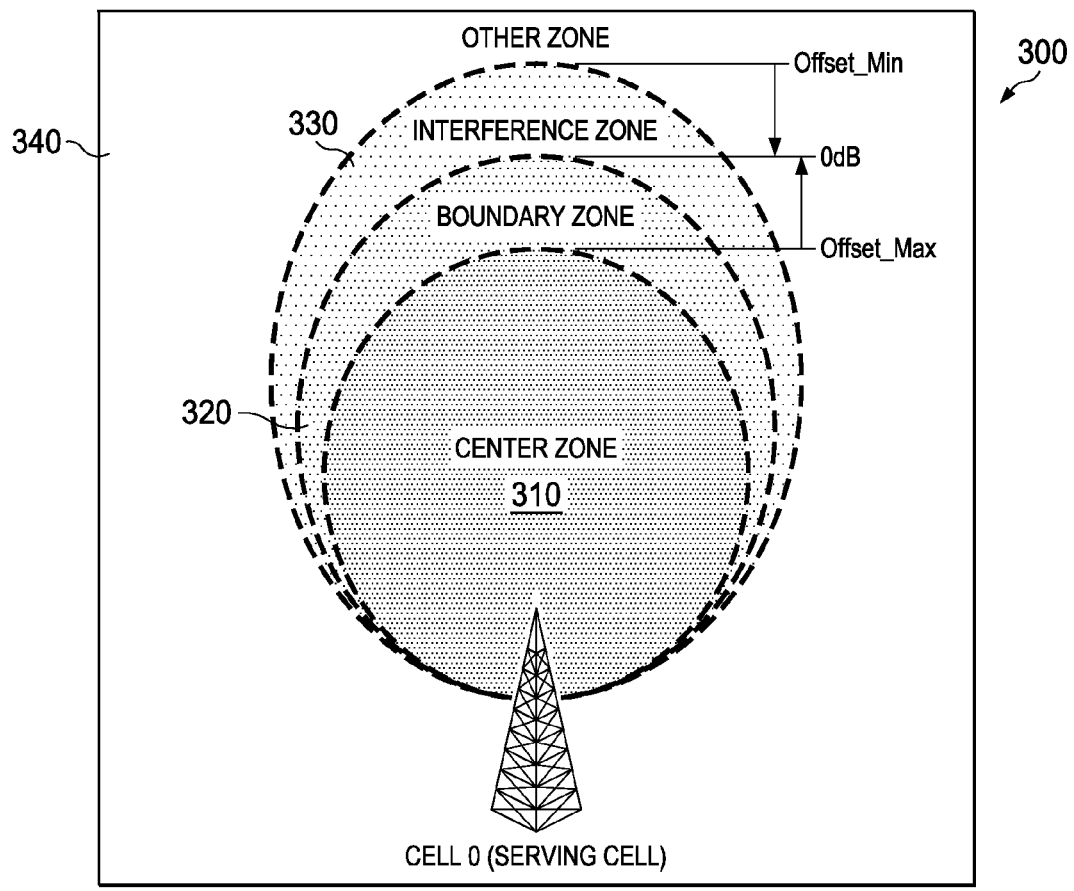
FIG. 3 illustrates another embodiment zone classification for a cell.

FIG. 3 shows a vertical geographical representation of an embodiment zone classification 300 for a cell for implementing adaptive beam shaping. Similar to the zone classification 200, the zone classification 300 assigns a center zone 310, a boundary zone 320, an interference zone 330, and an outer (or other) zone 340 for a considered cell under consideration. Specifically, the boundaries of the zones are set according to pre-determined and fixed thresholds of signal levels. The center zone 310 is the center coverage area of the serving cell under consideration. The boundary of the center zone 310 corresponds to a pre-determined threshold value, Offset-Max, in dB. As described above, gain adjustment is not applied for this zone.

The interference zone 330 is best served by one of the neighbor cells to the cell under analysis. The boundary of the interference zone 310 corresponds to a pre-determined threshold value, Offset-Min, in dB. If an average pilot/reference signal level of a bin from the cell under analysis compared to a maximum signal level from neighbor cells falls into this zone, the cell under analysis can cause interference to a best serving neighbor cell (associated with the maximum signal level). In this case, antenna gain is reduced to this bin from the serving eNB of the considered cell to reduce interference to the neighbor cell.

The boundary zone 320 is a handover region in which a UE may be supported by multiple cells. The boundary of the boundary zone 320 corresponds to a pre-determined threshold value of about 0 dB of a target signal strength. In this zone, antenna gain is increased to around 0 dB value of the target coverage requirement.

Figure 4:
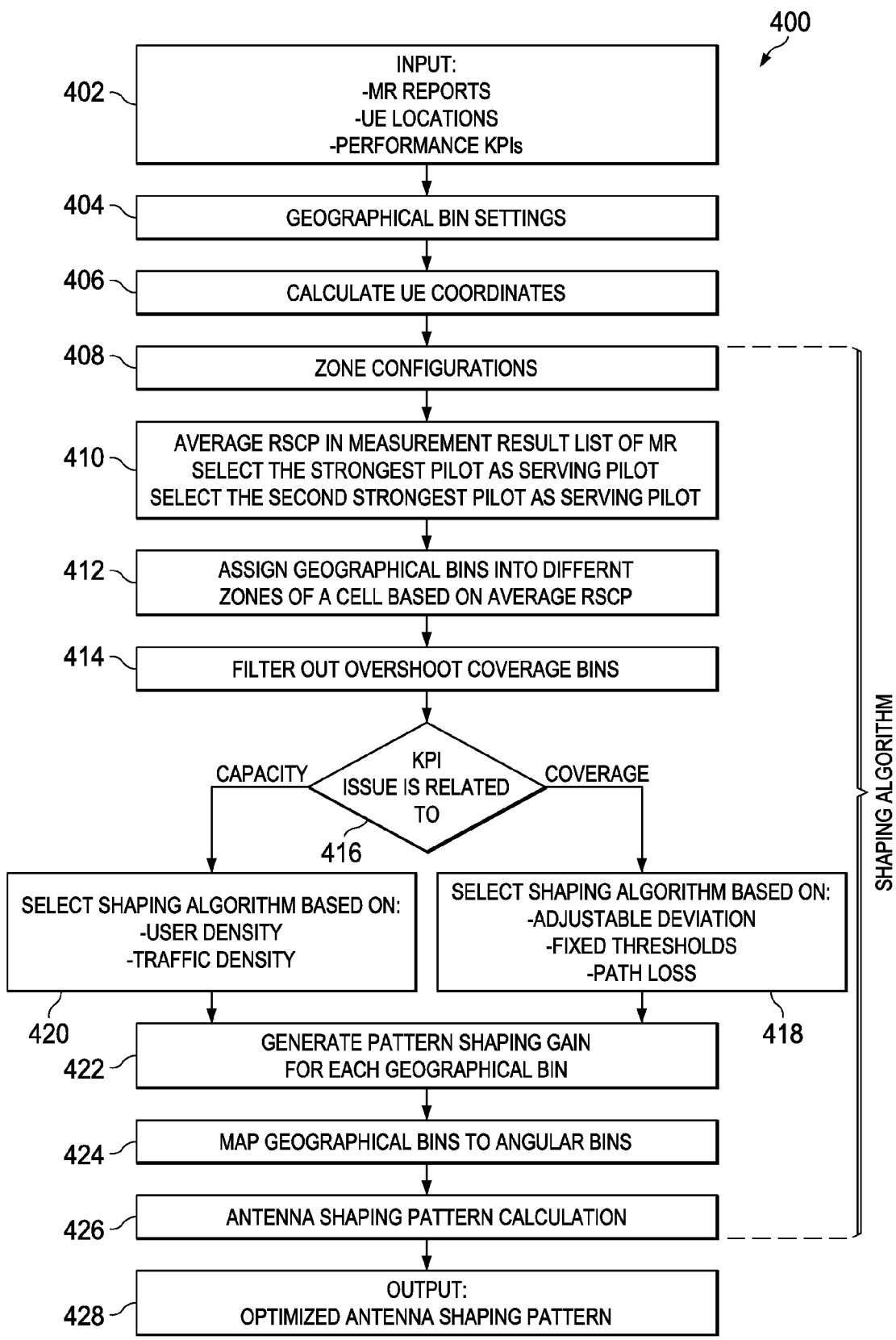
FIG. 4 is a flowchart of an embodiment method for a SON/AAS control function.

FIG. 4 illustrates an embodiment method 400 for a SON/AAS control function that is used to implement beam shaping in the SON/AAS 100, e.g., at the SON module 132. The method 400 may use the zone classification 200 or 300 to determine gain adjustment requirements for the bins in the different zones. At block or step 402, input information is received, including MR reports, UE locations, and performance KPI. For example, the information is received form a plurality of UEs 120 in the bins across the zones. The MR reports can include signal power or strength and signal quality. The UE locations can include GPS information, triangulation information, longitude and latitude coordinates, or other types of location information. The KPI includes criteria information for implementing beam shaping, such as traffic load information, signal strength levels at the UEs, signal strength levels at the cell (e.g., at cell tower or eNB), and/or other performance data.

At step 404, the geographical bins are set (using geographical bin settings). At step 406, the UE coordinates are calculated (using the receive location information). This step also includes mapping the UE coordinates to the bins. At step 408, the zones are configured (using zone configurations, e.g., boundary thresholds). At step 410, average measurements, e.g., average received signal code power (RSCP) in the case of a Universal Mobile Telecommunications System (UMTS), are calculated (for each bin) from a measurement result list of received MR reports. A strongest received pilot signal is selected (for each bin) from the average measurements as serving pilot (serving cell) from the average measurements. A second strongest received pilot signal is further selected (for each bin) from the average measurements as neighbor pilot (best serving neighbor cell).

At step 412, the geographical bins are assigned into the different zones based on the average measurements (e.g., average RSCP values) of the bins and the thresholds of the zones, as described in more detail below. At step 414, overshoot coverage bins (e.g., bins outside the interference zone receiving signals from the serving cell) are filtered out. This can be established by substantially reducing the signal gain to such bins.

At step 416, KPI is analyzed to determine whether to optimize coverage or capacity. The KPI indicates coverage or capacity requirements for the cell/users. Optimizing capacity may be considered as a special case of optimization coverage, where additionally user/traffic density is considered with signal coverage criteria. At step 418, to optimize coverage, a beam shaping algorithm is selected based on the fixed thresholds for the zones, adjustable deviation values to compare measured signals to thresholds, path loss, or a combination thereof. At step 420, to optimize capacity, a beam shaping algorithm is selected based on user density and/or traffic density in addition to the coverage considerations. At step 422, a pattern shaping gain is generated for each geographical bin, i.e., a gain adjustment gain is calculated for each bin.

At step 424, the geographical bins are mapped to angular bins. At step 426, an antenna shaping pattern is calculated (for the angular bins). The pattern shaping gain in each angular bin can be calculated by averaging the pattern shaping gains among geographical bins within an angular bin. The pattern shaping gain among angular bins is then normalized. At step 428, the antenna shaping pattern is provided as output to the smart antenna (or AAS) controller, e.g., at the first radio unit 122 through the CPRI. The antenna shaping pattern is applied over the original antenna pattern to produce the optimized (converged) antenna pattern. The cell tower or eNB can then apply the optimized antenna pattern for the cell.

Figure 5:
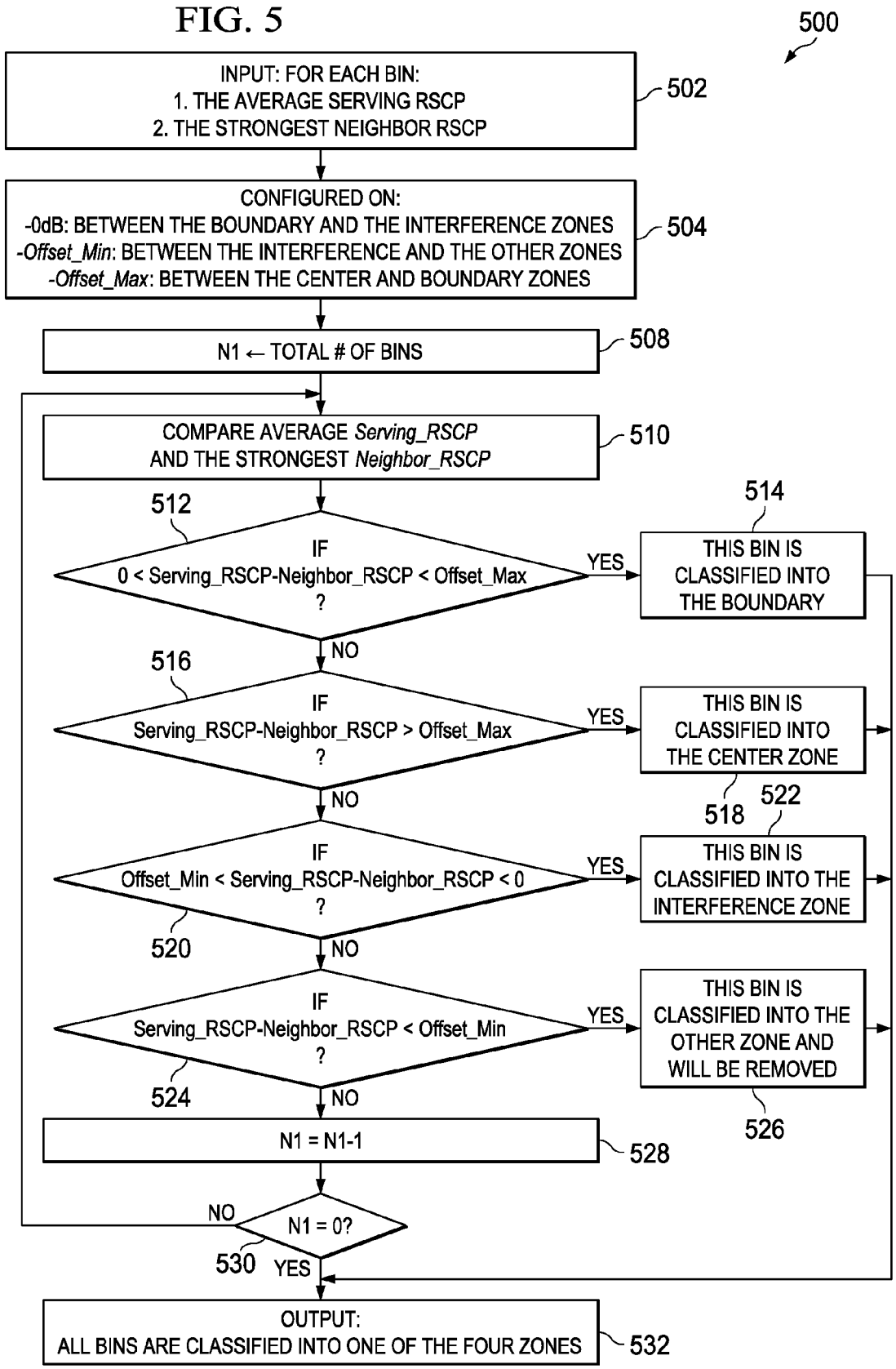
FIG. 5 is a flowchart of an embodiment method for mapping geographic bins into different zones.

FIG. 5 illustrates an embodiment method 500 for mapping geographic bins into different zones. This can be implemented at step 412 of the method 400. The method 500 may begin at step 502, where the following inputs for each bin are obtained: the average serving RSCP (in the case of UMTS) and the strongest neighbor RSCP (for a neighbor cell). In other embodiments, other measurement signal types are used based on the cellular network technology or standard. The average measurement for the serving cell from one bin is the average of all measurements received from one or more UEs in that bin. At step 504, the following boundary thresholds are configured: 0 dB between the boundary zone and the interference zone; Offset-Min dB between the interference zone and the other (or outer) zone and Offset-Max dB between the center zone and the boundary zone. At step 508, the total number of the bins is calculated as N1.

At step 510, the method 500 begins the comparison between the average RSCP for the serving cell under consideration (Serving-RSCP) and the strongest neighbor RSCP (Neighbor-RSCP) for a considered bin. At decision step 512, the method 500 determines whether the difference between the average Serving-RSCP and the strongest Neighbor-RSCP falls between 0 dB and Offset-Max dB, i.e., within the boundaries or limits of the boundary zone. If the condition in decision step 512 is true, then the method 500 proceeds to step 514, where the bin is classified into the boundary zone. Subsequently, the method 500 proceeds to step 532 (e.g., when all bins are processed). If the condition in step 512 is false, then the method 500 proceeds to decision step 516.

At decision step 516, the method 500 determines whether the difference between the average Serving-RSCP and the strongest Neighbor-RSCP exceeds Offset-Max dB, i.e., falls within the boundary of the center zone. If the condition in decision step 516 is true, then the method 500 proceeds to step 518, where the bin is classified into the center zone. Subsequently, the method 500 proceeds to step 532 (e.g., when all bins are processed). If the condition in step 516 is false, then the method 500 proceeds to decision step 520.

At decision step 520, the method 500 determines whether the difference between the average Serving-RSCP and the strongest Neighbor-RSCP falls between Offset-Min dB and 0 dB, i.e., falls within the boundaries of the interference zone. If the condition in decision step 520 is true, then the method 500 proceeds to step 522, where the bin is classified into the interference zone. Subsequently, the method 500 proceeds to step 532 (e.g., when all bins are processed). If the condition in step 520 is false, then the method 500 proceeds to decision step 524.

At decision step 524, the method 500 determines whether the difference between the average Serving-RSCP and the strongest Neighbor-RSCP is below Offset-Min dB, i.e., falls in the other or outer zone. If the condition in decision step 524 is true, then the method 500 proceeds to step 526, where the bin is classified into the other or outer zone. Subsequently, the method 500 proceeds to step 532 (e.g., when all bins are processed). If the condition in step 524 is false, then the method 500 proceeds to step 528, where the number of remaining bins for analysis is reduced by 1.

At decision step 530, the method 500 determines whether all bins have been analyzed and the number of remaining bins has reached 0. If the condition in decision step 530 is true, then the method 500 proceeds to step 532, where the classification of all bins into the different zones is provide as output, and the method 500 may end. If the condition in step 530 is false, then the method 500 returns to step 510 to continue classifying the remaining bins.

Figure 6:
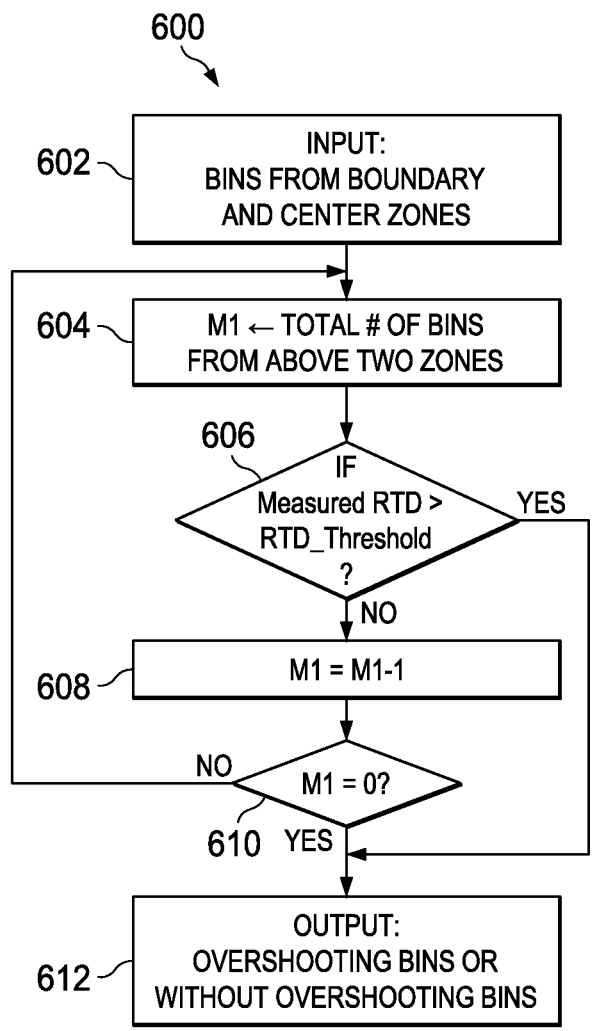
FIG. 6 is a flowchart of an embodiment method to filter overshooting bins.

FIG. 6 illustrates an embodiment method 600 to filter overshooting bins. This may be implemented at step 414 of the method 400. The method 600 may begin at step 602, where the bins classified into the boundary and interference zones are obtained (e.g., from step 412 or the method 500). At step 604, the total number of such input bins is calculated as M1. Next, at decision step 606, the method 600 determines whether a measured round-trip-delay (RTD) exceeds a RTD threshold for a considered bin. The measured RTD is equal to double the propagation delay between the cell tower or eNB and the UE in the bin. One or more RTD values may be measured between a cell tower or eNB and one or more UEs for a bin to calculate an average RTD for the bin. If the condition in the decision step 606 is true, then the bin is considered an overshooting bin, i.e., a bin outside the coverage of a cell that receives a signal from that cell. Subsequently, the method 600 proceeds to step 612 (e.g., when all bins are processed). Otherwise, the method 600 proceeds to step 608, where the number of remaining bins for analysis is reduced by 1.

Next, at decision step 610, the method 600 determines whether all bins have been analyzed and the number of remaining bins has reached 0. If this condition is true, then the method proceeds to step 612. Otherwise, the method 600 returns to step 604 to continue analyzing the remaining bins. At step 612, the overshooting bins or the remaining bins without the overshooting bins are provided as output.

Figure 7:
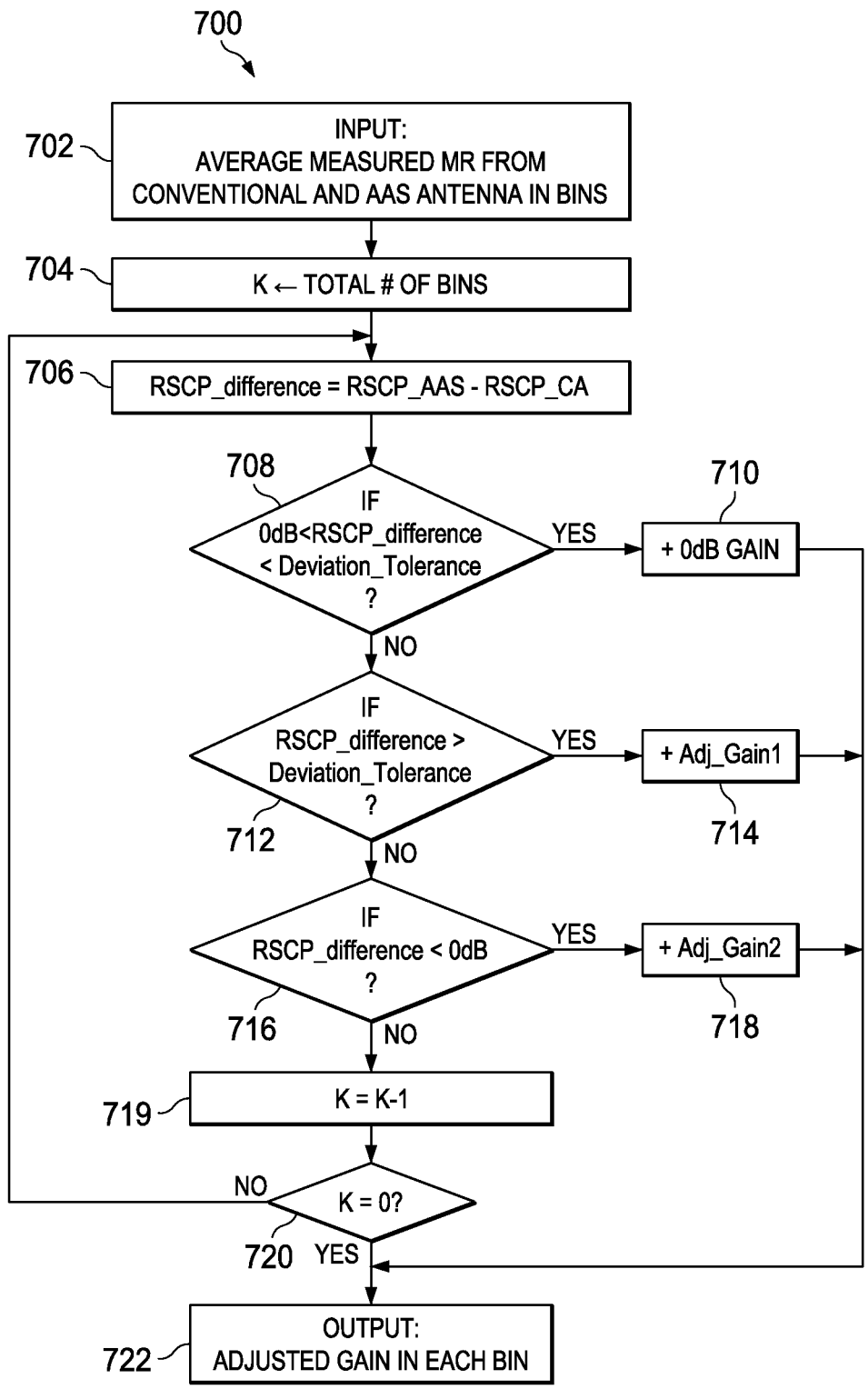
FIG. 7 is a flowchart of an embodiment method for antenna gain adjustment using an allowable deviation.

FIG. 7 illustrates an embodiment method 700 for antenna gain adjustment using an allowable deviation. This may be implemented at step 422 of the method 400. The method 700 may be used when a conventional antenna is replaced with a smart antenna or AAS. The method 700 may begin at step 702, where an average measured signal or MR is obtained as input from both convention and AAS antenna for each considered bin in the boundary and interference zones. The average measurement for the conventional antenna for the bin is obtained prior to replacing the conventional antenna with the AAS or smart antenna. The average measurement for the AAS or smart antenna for the same bin is obtained after replacing the conventional antenna with the AAS or smart antenna. At step 704, the total number of the bins (in boundary and interference zones) is calculated as K. At step 706, the difference between the average measurements of conventional and AAS antennas is calculated for a considered bin. For example, in the case of UMTS, the difference of average RSCP of both antenna types is calculated.

At decision step 708, the method 700 determines whether the difference between the average measurements (or RSCP-difference) exceeds 0 dB by no more than a predetermined deviation tolerance value, which represents a threshold for the range of tolerance for the difference in measurements between both antenna types. If the condition in decision step 708 is true, then the method 700 proceeds to step 710, where 0 dB adjustment gain is assigned to the bin. Subsequently, the method 700 proceeds to step 722 (e.g., when all bins are processed). If the condition in step 708 is false, then the method 700 proceeds to decision step 712.

At decision step 712, the method 700 determines whether RSCP-difference exceeds the deviation tolerance value (Deviation-Tolerance). If the condition in decision step 712 is true, then the method 700 proceeds to step 714, where a first adjustment gain is assigned to the bin. The first adjustment gain is calculated to meet a target value, as described further below. The first adjustment gain (Adj-Gain1) may be a negative value, which effectively reduces the signal gain for the corresponding bin to maintain the RSCP-difference value within the deviation tolerance range. Subsequently, the method 700 proceeds to step 722 (e.g., when all bins are processed). If the condition in step 712 is false, then the method 700 proceeds to decision step 716.

At decision step 716, the method 700 determines whether RSCP-difference is below 0 dB. If the condition in decision step 716 is true, then the method 700 proceeds to step 718, where a second adjustment gain is assigned to the bin. The second adjustment gain is calculated to meet a target value, as described further below. The second adjustment gain (Adj-Gain2) may be a positive value, which increases the signal gain for the corresponding bin to maintain the RSCP-difference above 0 dB and within the deviation tolerance range. Subsequently, the method 700 proceeds to step 722 (e.g., when all bins are processed). If the condition in step 716 is false, then the method 700 proceeds to decision step 719.

At step 719, the number of remaining bins for analysis is reduced by 1. At decision step 720, the method 700 determines whether all bins have been analyzed and the number of remaining bins has reached 0. If this condition is true, then the method proceeds to step 722. Otherwise, the method 700 returns to step 706 to continue analyzing the remaining bins. At step 722, the adjusted gains for all the bins are provided as output.

Figure 8:
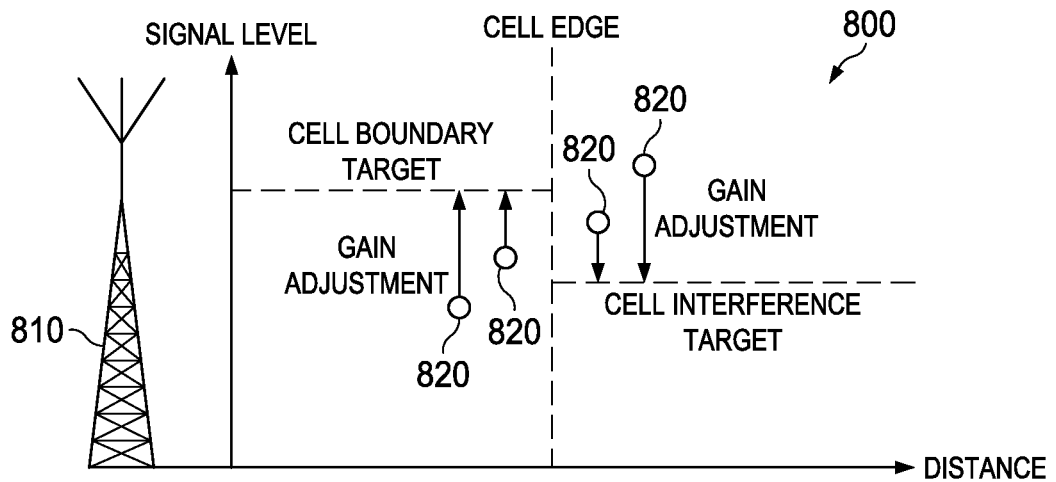
FIG. 8 illustrates an embodiment scheme for antenna gain adjustment using a fixed threshold.

FIG. 8 illustrates an embodiment scheme 800 for antenna gain adjustment using a pre-determined and fixed threshold. The scheme 800 may be achieved using the method 400 or any suitable combination of the functions or methods above. The scheme 800 compares the average measured pilot/reference signal, e.g., RSCP levels reported in MR data, of each bin 820 in the boundary zone and the interference zone to fixed target RF signal thresholds for coverage and interference signals. The target thresholds for the boundary and interference zones may be discontinuous around the cell's edge (form a base station or eNB 810), as shown in FIG. 8. The antenna gain in the location of each bin is adjusted such that the signal level in this bin matches the target values.

Figure 9:
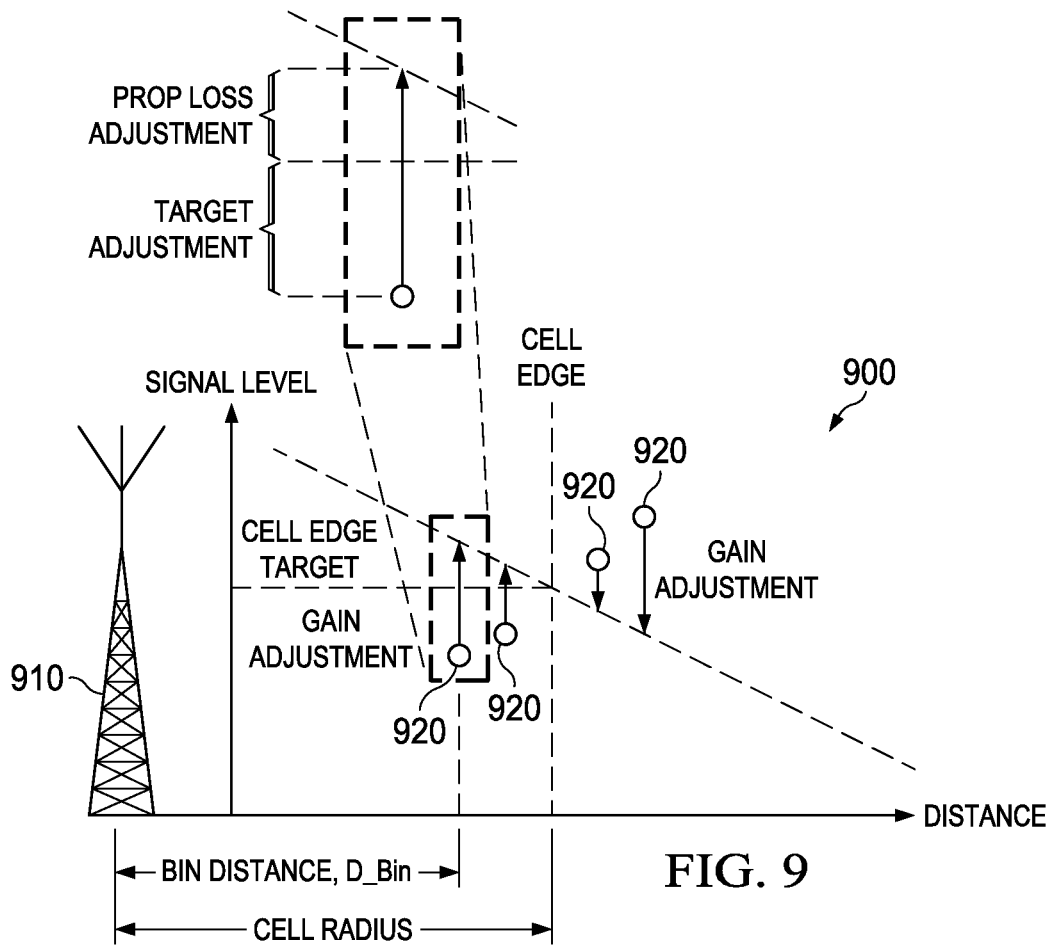
FIG. 9 illustrates an embodiment scheme for antenna gain adjustment based on path loss.

FIG. 9 illustrates an embodiment scheme 900 for antenna gain adjustment based on path loss. The scheme 900 may be achieved using the method 400 or any suitable combination of the functions or methods above. The scheme 900 compares the average measured pilot/reference signal of each bin 920 in the boundary zone and the interference zone to target RF signal thresholds for coverage and interference signals with an additional adjustment based on the distance of bins 920 from the serving eNB 910 or base station. The target thresholds for the boundary and interference zones may continuously decrease around the cell's edge, as shown in FIG. 9.

The antenna gain in the location of each bin is adjusted such that the signal level in this bin matches the target values taking into account the distance of the bins from the serving eNB 910. The distance of the bins from the serving eNB 910 is used to adjust the target signal levels at each bin through an approximated slope of a propagation model. Based on empirical RF propagation data, the slope of the propagation model can represent a stable function of the antenna height.

The beam shaping algorithm functions above, i.e., the methods 400-700, can be implemented to improve antenna coverage using the gain adjustments for geographical bins. The beam shaping algorithm can also be used to improve capacity based on user density (e.g., at step 420). Accordingly, the algorithm is configured to shape the antenna beam by weighting the antenna gain toward bins in the boundary zone with higher density of active users (i.e., active UEs) and weighting the antenna gain away from bins in the interference zone with higher density of active users. As such, the gain adjustments are proportional to the number of active UEs in the respective bins.

It can be assumed that traffic generated by each active user is similar on average. As a result, the required transmit power to serve users in the boundary zone is reduced after increasing antenna gain for bins in that zone, and hence the resulting increase in total available power can be used to serve more user traffic and improve cell capacity. The required transmit power to serve users in the interference zone is also reduced after decreasing antenna gain and interference power for bins in that zone, and hence the resulting increase in total available power can also be used to serve more user traffic and improve cell capacity.

The beam shaping algorithm functions can also be used to improve capacity based on traffic density (e.g., at step 420) with or without user density. Accordingly, when actual total traffic information in bins are available, the algorithm is configured to shape the antenna beam by weighting the antenna gain toward bins in the boundary zone with higher total traffic and weighting the antenna gain away from bins in the interference zone with higher total traffic. To achieve this, a metric of total traffic may be defined based on available traffic scheduling information from a scheduler component. For example, the average total throughput in megabits per second (Mbps) within an observed time period (e.g., 1 hour) can be defined as the metric for total traffic in a bin.

Similar to beam shaping based on user density, in beam shaping based on traffic density, the required transmit power to serve users in the boundary zone is reduced after increasing antenna gain for bins in that zone. The resulting increase in total available power can be used to serve more user traffic and improve cell capacity. The required transmit power to serve users in the interference zone is also reduced after decreasing antenna gain for bins in that zone, and the resulting increase in total available power can also be used to serve more user traffic and improve cell capacity.

Figure 10:
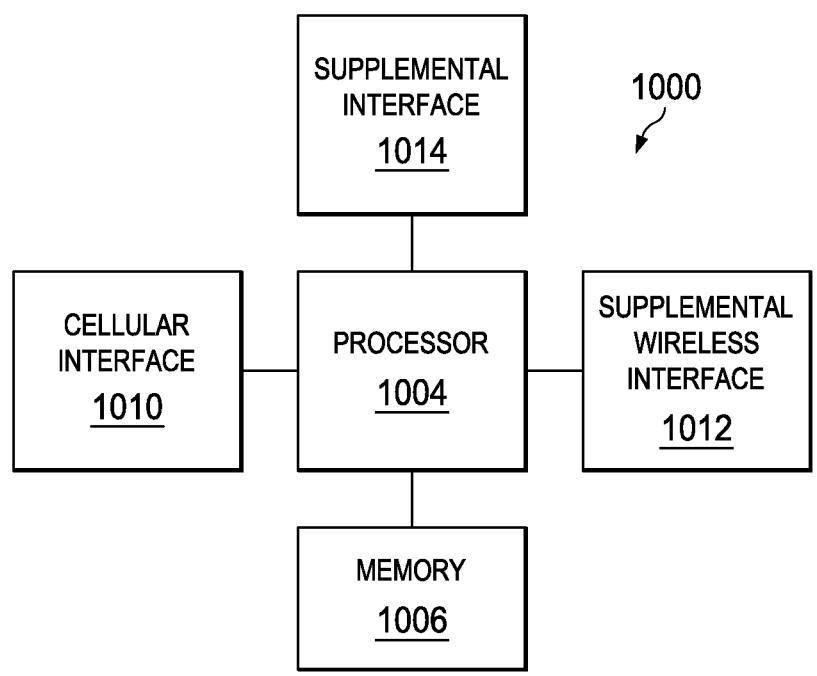
FIG. 10 is block diagram of an embodiment communications device.

FIG. 10 illustrates a block diagram of an embodiment of a communications device 1000, which may be equivalent to one or more devices (e.g., UEs, BSs, eNBs, etc.) discussed above. The communications device 1000 may include a processor 1004, a memory 1006, a cellular interface 1010, a supplemental wireless interface 1012, and a supplemental interface 1014, which may (or may not) be arranged as shown in FIG. 10. The processor 1004 may be any component capable of performing computations and/or other processing related tasks, and the memory 1006 may be any component capable of storing programming and/or instructions for the processor 1004. The processor 1004 may be configured to implement or support the ViMP cooperation schemes, scenarios, and strategies described above. For example, the processor 1004 may be configured to support or implement the method 400. The cellular interface 1010 may be any component or collection of components that allows the communications device 1000 to communicate using a cellular signal, and may be used to receive and/or transmit information over a cellular connection of a cellular network. The supplemental wireless interface 1012 may be any component or collection of components that allows the communications device 1000 to communicate via a non-cellular wireless protocol, such as a Wi-Fi or Bluetooth protocol, or a control protocol. The supplemental interface 1014 may be component or collection of components that allows the communications device 1000 to communicate via a supplemental protocol, including wireline protocols. In embodiments, the supplemental interface 1014 may allow the device 1000 to communicate with a backhaul network.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for beam shaping in a wireless network, the method comprising:
   dividing a geographical area into a plurality of geographical bins;
   setting up a plurality of zones for a cell based on a plurality of boundary thresholds;
   receiving a plurality of signal measurements from a plurality of user equipments (UEs) across the geographical bins;
   classifying the geographical bins into the plurality of zones by comparing the signal measurements to the boundary thresholds of the zones;
   calculating a plurality of gain adjustments for the corresponding geographical bins in at least some of the zones; and
   generating a beam shaping pattern based on the gain adjustments.

2. The method of claim 1 further comprising applying the beam shaping pattern to an existing antenna pattern to generate a converged antenna pattern, wherein the converged antenna pattern is optimized to improve signal coverage or communication capacity.

3. The method of claim 1 further comprising:
   receiving UE location information;
   calculating UE location using the UE location information; and
   mapping the UEs to the geographical bins.

4. The method of claim 1 further comprising:
   for each of the geographical bins, calculating a plurality of average signal measurements using the received measurements;
   selecting a serving cell signal measurement that corresponds to a strongest average signal measurement from the calculated average signal measurements; and selecting a neighbor cell signal measurement that corresponds to a second strongest average signal measurement from the calculated average signal measurements.

5. The method of claim 4, wherein the zones comprise a center zone, a boundary zone, an interference zone, and an outer zone, and wherein the method further comprises:
for each of the geographical bins, calculating a difference between the serving cell signal measurement and the neighbor cell signal measurement;
classifying a bin into the boundary zone if the calculated difference is smaller than a first boundary threshold for the center zone and greater than a second boundary threshold for the boundary zone;
classifying the bin into the center zone if the calculated difference is greater than the first boundary threshold for the center zone;
classifying the bin into the interference zone if the calculated difference is smaller than the second boundary threshold for the boundary zone and greater than a third boundary threshold for the interference zone; and
classifying the bin into the outer zone if the calculated difference is smaller than the third boundary threshold for the interference zone.

6. The method of claim 5 further comprising:
for each of the geographical bins, calculating a first average measurement for a conventional antenna and a second average measurement for a smart antenna replacing the conventional antenna;
assigning a 0 decibel (dB) gain adjustment for a corresponding bin if the difference is greater than 0 dB by less than a pre-determined deviation tolerance threshold;
assigning a negative gain adjustment value for the corresponding bin if the difference is greater than the pre-determined deviation tolerance threshold; and
assigning a positive gain adjustment value for the corresponding bin if the difference is less than 0 dB.

7. The method of claim 1 further comprising:
receiving key performance information (KPI) for implementing beam shaping including traffic load information, signal strength levels at the UEs, signal strength levels received at the cell, or combinations thereof; and
calculating the gain adjustments based on the KPI.

8. The method of claim 1 further comprising filtering out one or more overshooting bins from the geographical bins.

9. The method of claim 8 further comprising:
for each of the geographical bins, calculating a round trip signal delay for a bin;
designating the bin as an overshooting bin if the calculated round trip signal delay exceeds a pre-determined threshold round trip delay; and
substantially reducing a signal gain for the overshooting bin.

10. The method of claim 1 further comprising:
mapping the geographical bins into a plurality of angular bins; and
calculating an antenna shaping pattern for the angular bins.

11. The method of claim 1, wherein the zones are defined zones according to signal levels, and wherein the plurality of boundary thresholds are pre-determined thresholds of signal levels in decibel (dB).

12. A network component providing beam shaping in a wireless network, the network component comprising:
a processor; and
a computer readable storage medium storing programming for execution by the processor, the programming including instructions to:
receive a plurality of signal measurements from a plurality of user equipments (UEs) across a plurality of geographical bins for a region that covers a cell;
classify the geographical bins into a plurality of zones for the cell based on comparison between the signal measurements and a plurality of pre-determined boundary thresholds for the zones;
calculate a plurality of gain adjustments for the corresponding geographical bins in at least some of the zones; and
generate a beam shaping pattern based on the gain adjustments.

13. The network component of claim 12, wherein the zones are concentric with the cell and comprise a boundary zone that has a boundary matching a boundary of the cell, a center zone that has a boundary within the boundary of the cell, an interference zone that has a boundary outside the cell's boundary, and an outer zone beyond the interference zone's boundary.

14. The network component of claim 13, wherein the gain adjustments for the corresponding geographical bins are calculated for the boundary zone and the interference zone and not for the center zone and the outer zone.

15. The network component of claim 13, wherein calculating the gain adjustments for the corresponding geographical bins comprises weighting the gain adjustments toward the geographical bins with higher density of UEs in the boundary zone and weighting the gain adjustments away from geographical bins with higher density of UEs in the interference zone, and wherein the gain adjustments are proportional to a number of UEs in the corresponding bins to improve capacity.

16. The network component of claim 13, wherein calculating the gain adjustments for the corresponding geographical bins comprises weighting the gain adjustments toward the geographical bins with higher density of traffic in the boundary zone and weighting the gain adjustments away from geographical bins with higher density of traffic in the interference zone, and wherein the gain adjustments are proportional to traffic load in the corresponding bins to improve capacity.

17. The network component of claim 13, where the gain adjustments are increased for the geographical bins in the boundary zone and decreased for the geographical bins in the interference zone, and wherein the gain adjustments are increased for the boundary zone and decreased for the interference zone to reduces transmit power in the cell and provide more available transmit power for improving coverage, improving at least one of user and traffic capacity, or improving both coverage and capacity.

18. The network component of claim 13, wherein the gain adjustments are based on fixed pre-determined boundary thresholds for the boundary zone and the interference zone, and wherein the gain adjustments match a plurality of signal levels in the geographical bins to a first fixed target threshold for the boundary zone and a second fixed target threshold for the interference zone.

19. The network component of claim 13, wherein the gain adjustments are based on pre-determined boundary thresholds for the boundary zone and the interference zone with an adjustment based on distances of the geographical bins in the cell, and wherein the gain adjustments match a plurality of signal levels for the geographical bins in the boundary zone and the interference zone through an approximated slope of a propagation model.

20. The network component of claim 12, wherein the zones are defined zones according to signal levels, and wherein the plurality of boundary thresholds are pre-determined thresholds of signal levels in decibel (dB).

21. An apparatus that supports beam shaping in a wireless network, the apparatus comprising:
- a first module coupled to a second module and configured to generate a beam shaping pattern by calculating a plurality of signal gains for a plurality of geographical bins configured across a cell,
- wherein the signal gains are calculated based on a plurality of signal measurements and a plurality of pre-determined boundary thresholds for a plurality of zones configured for the cell; and
- wherein the second module is configured to calculate a converged antenna pattern based on the beam shaping pattern.

22. The apparatus of claim 21, wherein the first module is configured to communicate with a base station to receive one or more measurement reports (MRs) that comprise the signal measurements and receive location information for a plurality of user equipments (UEs) in the cell that associate the signal measurements with the plurality of geographical bins, and wherein the base station is configured to apply the converged antenna pattern in the cell.

23. The apparatus of claim 21, wherein the zones are different signal level zones.

* * * * *

UNITED STATES PATENT AND TRADEMARK OFFICE
CERTIFICATE OF CORRECTION

| | | |
|---|---|---|
| PATENT NO. | : 8,738,022 B2 | Page 1 of 1 |
| APPLICATION NO. | : 13/646557 | |
| DATED | : May 27, 2014 | |
| INVENTOR(S) | : Shuqing Xing | |

It is certified that error appears in the above-identified patent and that said Letters Patent is hereby corrected as shown below:

In the Claims:

In Col. 12, line 45, claim 17, delete "reduces" and insert --reduce--.

Signed and Sealed this
Second Day of September, 2014

Michelle K. Lee
*Deputy Director of the United States Patent and Trademark Office*